United States Patent [19]

Shimmell

[11] Patent Number: 5,313,703
[45] Date of Patent: May 24, 1994

[54] BEARING CAP AND METHOD FOR MAKING SAME

[75] Inventor: Dennis S. Shimmell, Hudsonville, Mich.

[73] Assignee: Nelson Metal Products Corporation, Grandville, Mich.

[21] Appl. No.: 886,694

[22] Filed: May 20, 1992

[51] Int. Cl.⁵ .................................................. B23P 15/00
[52] U.S. Cl. ...................................... 29/890.12; 29/898
[58] Field of Search ................... 29/898.12, 898.054, 29/898; 384/129

[56] References Cited

U.S. PATENT DOCUMENTS

| | | | |
|---|---|---|---|
| 1,834,746 | 12/1931 | Short | 29/898.12 |
| 1,939,467 | 12/1933 | Short et al. | 29/898.12 |
| 2,044,897 | 6/1936 | Boegehold et al. | 29/898.12 |
| 2,060,034 | 11/1936 | Chandler | 29/898.12 |
| 2,086,841 | 7/1937 | Bagley et al. | 29/898.12 |
| 2,331,584 | 10/1943 | Underwood | 29/898.12 |
| 2,371,399 | 3/1945 | Mantle | 29/898.12 |
| 2,465,329 | 3/1949 | Murray | 29/898.12 |
| 3,088,783 | 5/1963 | Conover | 29/898.12 |
| 3,790,236 | 2/1974 | Pierce . | |
| 3,995,357 | 12/1976 | Boggs et al. | 29/898.12 |
| 5,199,170 | 4/1993 | Mori et al. | 29/898 |

FOREIGN PATENT DOCUMENTS

| | | |
|---|---|---|
| 0167320 | 1/1986 | European Pat. Off. . |
| 3423306 | 1/1986 | Fed. Rep. of Germany . |
| 0005071 | 1/1977 | Japan .................................... 29/898 |

*Primary Examiner*—Irene Cuda
*Attorney, Agent, or Firm*—Warner, Norcross & Judd

[57] ABSTRACT

A method for making a bearing cap in which the bearing cap has first and second parts with precisely mating surfaces. The first part is cast such that the mating surfaces thereof are formed with protrusions terminating in enlarged heads. The second part is cast in place against the first part such precisely mating surfaces are formed with the second part enveloping the protrusions. The two parts thus cast are forced apart from each other such that the protrusions fracture across the narrowed neck portions by which the heads are joined.

11 Claims, 3 Drawing Sheets

BEARING CAP AND METHOD FOR MAKING SAME

BACKGROUND OF THE INVENTION

1. Field of the Invention

The present invention relates to a bearing cap and, more particularly, to a cast bearing cap having precisely interfitting and mating parts and to a method for making such a bearing cap.

2. Description of the Related Art

The term "bearing cap" as used herein denotes a device used to surround, support, and guide a rotating or reciprocating shaft. A typical use is at a point of penetration of the shaft through a housing or enclosure such as at the passage of a camshaft or crankshaft through an engine block. Another typical use is at the passage of a crankshaft through a piston connecting rod. The bearing cap may make direct contact with the shaft, or, as is more frequently the case, the bearing cap may surround a bearing which, in turn, directly contacts the shaft. In either event, the bearing caps must be manufactured to close tolerances in order to provide a close, uniform fit around the shaft or bearing.

Bearing caps are frequently formed as split rings having two parts surrounding the shaft or bearing and joined together along a diametric line. With such split rings, not only must the central bore fit closely to the shaft or bearing, but the parts of the caps must fit precisely together at the mating surfaces of the parts of the caps. If the parts of the caps are manufactured separately and individually for subsequent machining and assembly, it is difficult to maintain the tolerances necessary to provide a sufficiently precise fit.

It has been proposed in the prior art to manufacture a two part bearing cap from a unitary bar stock or a cast unitary metal ring. The two parts of the bearing cap are made by first defining a diametric fracture plane by forming weakened diametric notches or grooves on the outer surfaces of the ring on either side of the central opening of the ring. Force is applied to the portions of the ring at opposite sides of the notches or grooves sufficient to fracture the ring along the fracture plane and form two separate ring halves. The intended result of this method is that the fractured diametric surfaces of the ring halves will mate precisely when the ring halves are placed around a shaft or bearing and brought back together.

In practice, however, the aforementioned prior art method has significant drawbacks. First, when the ring is fractured, the metal at the fracture surface is frequently splintered or distorted. Because of this distortion, the fracture surfaces do not precisely mate together when the ring halves are brought together. Second, since the ring must be fractured across its entire diametric cross-sectional area, the force required to produce the fracture is huge. Such force is concentrated at the points where the fracturing device contacts the ring, thus causing the ring to bend and lose its desired dimensions. Third, an embedded steel reinforcing insert may not be used since the internal boundaries between the steel insert and the surrounding cast metal will define stress lines. The ring will tend to fracture along these stress lines rather than along the intended diametric plane.

In another prior art method of manufacturing a two part bearing cap, two semicylindrical halves are first formed separately. The mating diametric surfaces of each half are machined and bores are drilled into the surfaces. Dowels are inserted into the bores and the two halves are assembled together aligned by the dowels. Next, the central opening of the assembled bearing cap is machined to the desired diameter and finish. The halves are then disassembled.

This second prior method also presents significant drawbacks. The method is quite costly, requiring dowels, a step of machining the four mating surfaces, and a step of drilling the four bores for the dowels. Several close tolerances must be held, including the positioning and diameter of the dowel bores and the flatness and orientation of the mating surfaces. A step of assembling bearing cap parts is required before the central opening can be machined, and it may be necessary to bolt the bearing cap parts together before the machining can be done.

Accordingly, there is a heretofore unmet need for a bearing cap having parts which precisely intermit and an economical method for making such a bearing cap.

SUMMARY OF THE INVENTION

The present invention satisfies the aforementioned need by providing a two part bearing cap in which the first part is die cast separately and the second part is subsequently die cast to intermit and interlock with the first part. When molten metal is die cast against the surface of a previously cast metal part, the molten metal does not adhere to the previously cast part. The two parts are then separated by fracturing at the interlock between the parts. Since the second part is cast in place with respect to the first part, the mating surfaces of the two parts intermit precisely and exactly together.

In a preferred embodiment of the invention, the mating surfaces of the first bearing cap part is formed with frustoconical protrusions having enlarged distal ends. When the second part is cast, the second part envelops these protrusions, thus capturing the enlarged ends of the protrusions. The two parts are thus held firmly together during any machining operations which may be required. When force is applied to separate the two parts, the protrusions fracture at the neck by which the enlarged ends are connected to the protrusions. These necks thus provide fracture zones having a greatly reduced cross-sectional area as compared to the area of the mating surfaces of the parts. Thus, a only a relatively small force is needed to fracture the necks of the protrusions and separate the parts. The small force required will not bend the parts.

When the parts of the bearing cap of the invention are first separated, recesses are formed in the second part which mate precisely with the protrusions on the first part. Thus, the protrusions and recessions provide a dowel-like means for precisely aligning the two parts with respect to each other when the parts are reassembled.

In a preferred embodiment of the method of the invention, the bearing caps are die cast in a die having two cavities. The first cavity is for forming the first part only. The second cavity is for receiving a previously cast first part and for forming a second part in interlocking relationship with a previously cast first part. Thus, each cycle of the die can produce a separate first part and a fully formed bearing cap. The central opening of the bearing cap may be machined prior to separating the two parts.

These and other objects, advantages, and features of the present invention will be more fully understood and appreciated by reference to the written specification and appended drawings.

DESCRIPTION OF THE PREFERRED EMBODIMENT

Figure 1:
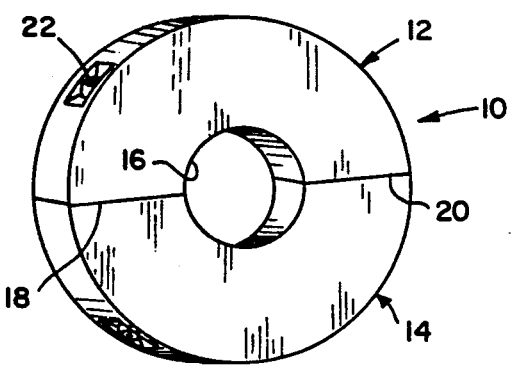
FIG. 1 is a perspective, somewhat diagrammatic, view of a bearing cap according to the principles of the invention.

By way of disclosing a preferred embodiment, and not by way of limitation, there is shown in FIG. 1 a bearing cap 10 which includes in its general organization a first part 12, or upper half, and a second part 14, or lower half. Together, the parts form a circular disk having a central circular opening 16 for the passage of a shaft, the retention of a bearing, or the like. Other, noncircular shapes are possible within the scope of the invention. For example, if the bearing cap is used at the end of a piston connecting rod, first part 12 may have an integral connecting rod portion extending therefrom. At either side of the central opening, the first and second parts 12, 14 are mated together along diametrically disposed planes 18, 20. The parts are held together in assembled relationship by bolts 22, screws, or other suitable fasteners which extend through holes as more fully described below. The parts are preferably formed of cast aluminum. A suitable material is 380 aluminum.

Figure 2:
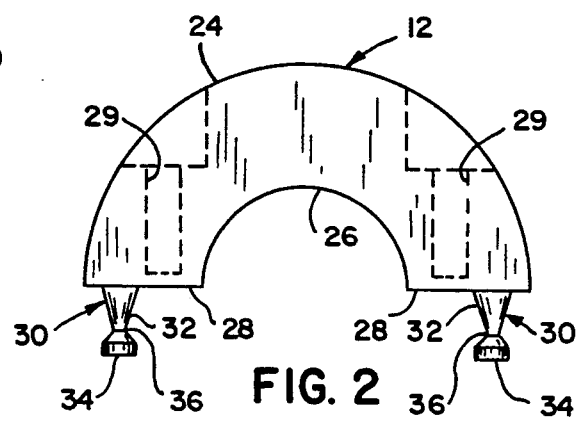
FIG. 2 is a front elevational view of the separately formed upper half of the bearing cap of FIG. 1.
Figure 3:
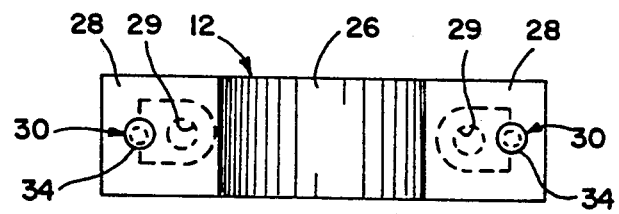
FIG. 3 is a bottom view of the bearing cap upper half of FIG. 2.

Details of the first part 12, or upper half, are shown in FIGS. 2 and 3. The first part 12 is in the form of a semicylinder, or half ring, having an outer surface 24, an inner surface 26, and a pair of planar mating surfaces 28 disposed at either side of the central opening through which the shaft will pass. The first part is formed with a pair of countersunk bores 29 through which fasteners will pass when the bearing cap is assembled.

An integral protrusion 30 extends from each of the mating surfaces 28 disposed axially perpendicularly to the mating surfaces. Each protrusion includes an outwardly narrowing frustoconical portion 32, an enlarged head 34, and a neck portion 36 joining the frustoconical portion to the head. The neck portions 36 form areas of reduced cross-sectional area across which the protrusions may be fractured to separate the heads 34 from the frustoconical portions 32.

Figure 4:
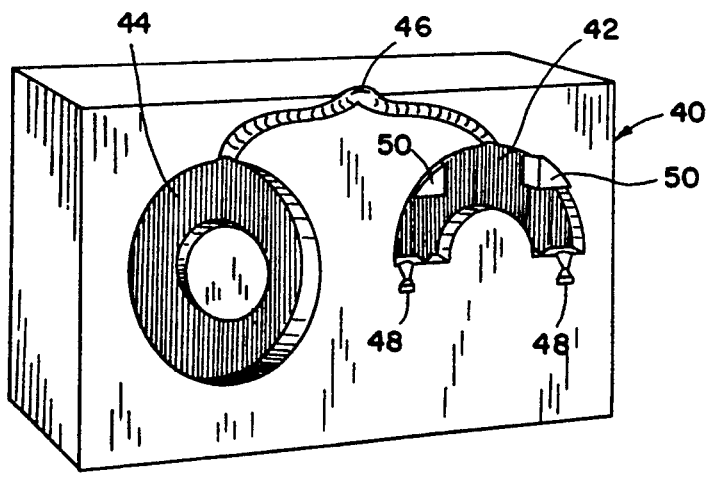
FIGS. 4-7 are perspective, diagrammatic, views of a die half used according to the method of the invention to manufacture the bearing cap of FIG. 1, illustrating steps in the method.

An apparatus and method for manufacturing the bearing cap of the invention are shown in FIGS. 4-9. In FIG. 4, it may be seen that the die half 40 is formed with two cavities 42, 44 and a bifurcated passageway 46 for introducing molten metal into the cavities. As is well known in the art, an identical, mating die half is used with the die half shown in the Figures.

Cavity 42 is used to separately cast the first parts 12 of the bearing cap. As such, cavity is generally semicylindrical with two smaller recess 48 corresponding to the protrusions 30 shown in FIG. 2. Cavity 44 is cylindrical, and conforms to the overall shape of the fully assembled bearing cap as shown in FIG. 1.

As shown in FIG. 4, cores 50 are positioned in the cavity 42 prior to casting the first parts 12. As is well known in the art, these cores will prevent metal from filling the countersunk bores 29 (FIG. 2). The cores are removed after the bearing cap is fully cast.

Figure 5:
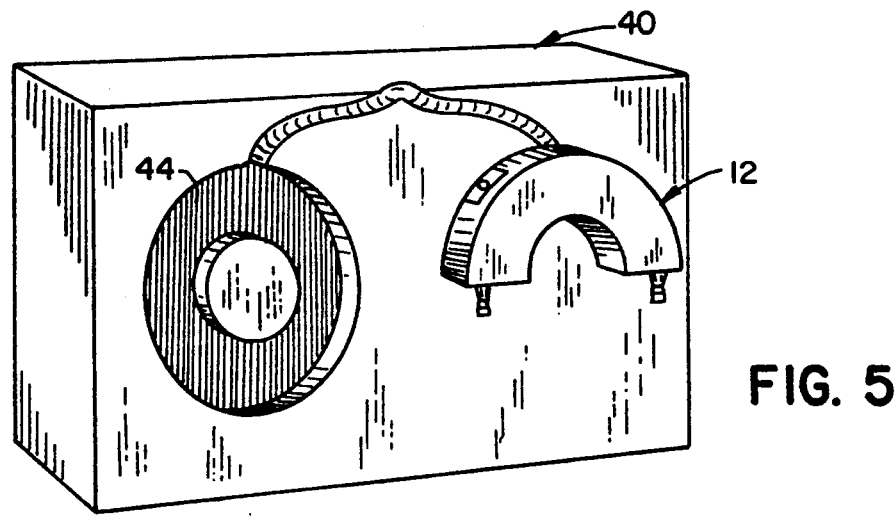
Figure 6:
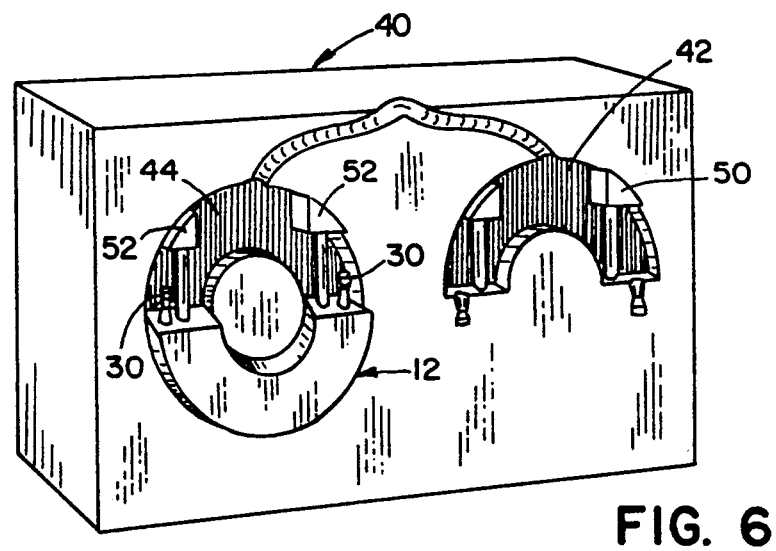

Two die halves are brought together, and molten metal is introduced into the cavity 42. As shown in FIG. 5, a first part 12 is thus formed. Next, as shown in FIG. 6, the newly formed first part 12 is removed from the cavity 42. The first part 12 is inverted and placed in the lower portion of cavity 44. New cores 50 are placed in the cavity 42. Similarly, cores 52 are placed in the upper portion of the cavity 44 in alignment with the countersunk bores formed in the first part 12. The protrusions 30 of the first part 12 extend upwardly into the unoccupied upper portion of the cavity 44.

Figure 7:
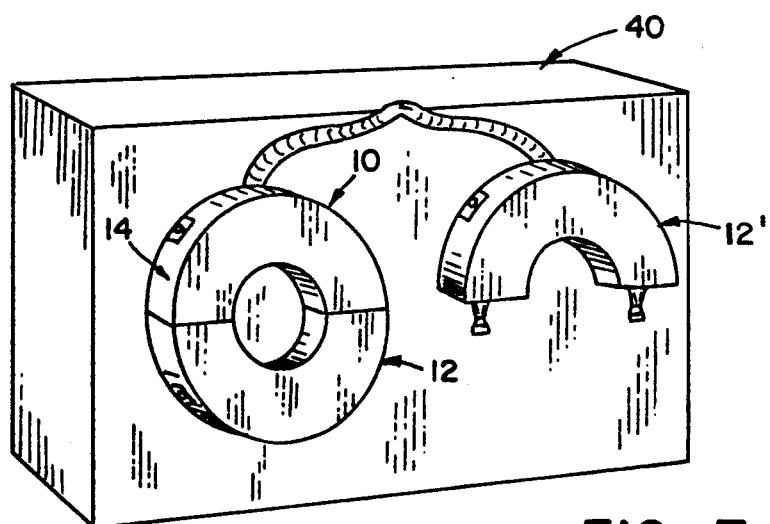

Next, the two die halves are again brought together, and molten metal is introduced into both cavities 42 and 44. As shown in FIG. 7, this results in the formation of a second bearing cap first part 12' in the cavity 42, and the formation of a bearing cap second part 14 in the upper portion of the cavity 44. The second part 14 is thus perfectly mated to the first part 12. The newly cast metal of the second part 14 does not adhere to the previously cast metal of the first part 12 which allows the two parts to be subsequently separated.

The bearing cap 10 thus formed is then removed from the die 40. The cores 50, 52 are removed. Bearing cap 12' is transferred to the cavity 44. The steps illustrated in FIGS. 6 and 7 are repeated, with each cycle producing a fully formed bearing cap 10 and a separate first part 12.

Figure 8:
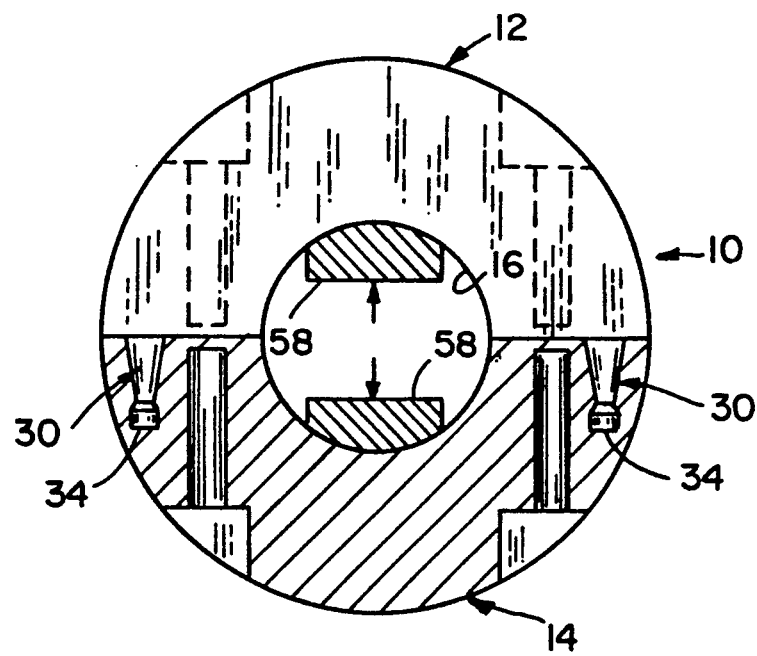
FIG. 8 is a front elevational view of the bearing cap with the second part in vertical section prior to fracturing the protrusions of the first part.

As shown in FIG. 8, the metal of the second part 14 of a newly formed bearing cap 10 completely envelops the protrusions 30 of the first part 1. The heads 34 of the protrusions are captured by, and interlocked with, the second part. At this point, the central opening 16 of the bearing cap may be machined to the desired diameter and surface finish. If necessary, the countersunk bores such as bore 29 may be drilled to the correct diameter or tapped. The parts are rigidly held together during such machining by the protrusions and heads interlocked with the second part.

Figure 9:
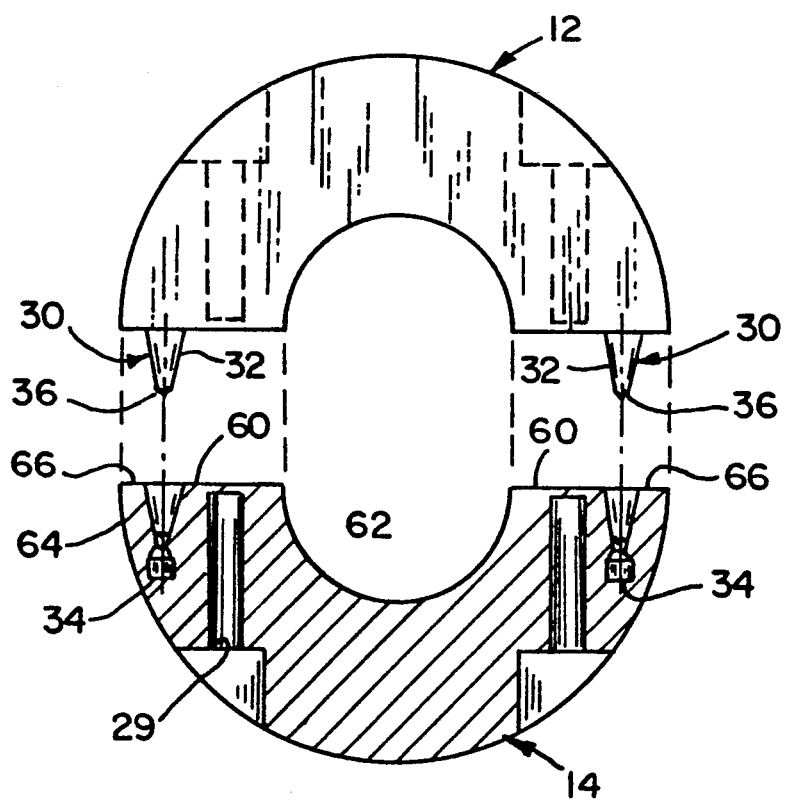
FIG. 9 is an exploded front elevational view of the bearing cap with the second part in vertical section subsequent to fracturing the protrusions of the first part.

To separate the two parts, a device having fingers 58 is inserted into the central opening 16 of the bearing cap. The fingers are then forcefully spread apart. As shown in FIG. 9, the spreading apart of the fingers 58 causes the protrusions 30 to fracture and break at their neck portions 36 thus separating the bearing cap parts 12, 14. Only a relatively small force is required to fracture the necks because of their small cross-sectional area. The heads 34 remain embedded in the second part 14.

The second part 14 thus formed is provided with planar mating surfaces 60, inner surface 62, and outer surface 64 which mate perfectly with the corresponding surfaces of the first part 12. A frustoconical recess 66 is formed through each of the mating surfaces 60. Each recess 66 mates perfectly with the frustoconical portions 32 of the protrusions 30 of the first part 12. Thus, when the bearing cap is reassembled around a shaft or bearing, the frustoconical portions 32 and the recesses 66 guide the two parts together into perfect coalignment.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A method for making a bearing cap having first and second interfitting parts with mating surfaces disposed on opposite sides of a central opening for the passage of a shaft, said method comprising the steps of:
    forming said first part such that said first part is formed with protrusions extending from the mating surfaces of said first part;
    subsequent to the forming of said first part, forming said second part in place with said first part such that the material of said second part envelops said protrusions and mates precisely with the mating surfaces of said first part and;
    separating said second part from said first part.

2. The method of claim 1 wherein said step of forming further comprises forming said protrusions with an enlarged head joined to said protrusions by a narrowed neck portion, and wherein said step of forming said second part comprises capturing said enlarged heads within the material of said second part.

3. The method of claim 2 wherein said step of separating comprises forcing said first and second parts apart until said narrowed neck portion of each said protrusion fractures.

4. The method of claim 1 further comprising the step of forming coaligned bores through said first and second parts for the insertion of fasteners for holding said first and second parts in assembled relationship.

5. The method of claim 1 wherein said steps of forming are performed by die casting.

6. A method for making a bearing cap having first and second interfitting parts with mating surfaces disposed at opposite sides of a central opening for the passage of a shaft, said method comprising the steps of:
    providing a first die cavity having a shape corresponding to the shape of said first part;
    providing a second die cavity having a shape corresponding to the shape of said bearing cap;
    casting a said first part in said first die cavity such that said first part is formed with a protrusion extending integrally outwardly from each of said mating surface of said first part, each said protrusion terminating in a head joined to said protrusion by a neck portion having a cross section of reduced area with respect to the area of the mating surface from which the protrusion extends;
    transferring the first part thus cast from said first die cavity to said second die cavity thereby leaving a portion of said second die cavity unoccupied by said first part;
    casting a said second part in place in said unoccupied portion of said second die cavity such that said second part mates precisely with said first part and such that the material of said second part envelops each said protrusion of said first part with each said head captured by said second part;
    forcing said first and second parts apart from each other such that said protrusions are separated from said heads across said neck portions leaving said heads embedded within said second part.

7. The method of claim 6 wherein said step of casting a said second part further includes casting another of said first part in said first cavity.

8. The method of claim 6 wherein each of said steps of casting includes forming bores in said first and second parts for the insertion of fasteners.

9. The method of claim 6 wherein said step of casting a said first part includes forming said protrusions as frustoconical, outwardly narrowing shapes.

10. The method of claim 6 wherein said first die cavity and said second die cavity comprise a single die.

11. The method of claim 6 further comprising the step of machining said central opening of said bearing cap prior to said step of forcing said first and second parts apart from each other.

* * * * *

UNITED STATES PATENT AND TRADEMARK OFFICE
CERTIFICATE OF CORRECTION

PATENT NO. : 5,313,703
DATED : May 24, 1994
INVENTOR(S) : Dennis S. Shimmell

It is certified that error appears in the above-indentified patent and that said Letters Patent is hereby corrected as shown below:

Title page, in the Abstract, line 1:
  "A method for making a bearing cap" should be
  --A bearing cap and method for making same are disclosed--

Column 5, Claim 1, Line 24:
  "and;" should be --part; and--

Signed and Sealed this

Thirteenth Day of September, 1994

Attest:

BRUCE LEHMAN

Attesting Officer

Commissioner of Patents and Trademarks